United States Patent [19]

Mahmood

[11] 4,308,598
[45] Dec. 29, 1981

[54] SIMPLIFIED ROLL ALONG SWITCHING

[75] Inventor: Kamal A. Mahmood, El Paso, Tex.

[73] Assignee: The Anaconda Company, Greenwich, Conn.

[21] Appl. No.: 55,632

[22] Filed: Jul. 9, 1979

[51] Int. Cl.³ .............................................. G01V 1/22
[52] U.S. Cl. ...................................... 367/79; 367/59;
367/63; 370/80; 370/113; 307/243
[58] Field of Search ...................... 367/56, 58, 59, 63,
367/78, 79; 370/80, 112, 113; 328/104, 137, 154; 307/243

[56] References Cited

U.S. PATENT DOCUMENTS

| | | | |
|---|---|---|---|
| 3,240,286 | 3/1966 | Musgrave | 367/63 |
| 3,427,475 | 2/1969 | Wilkinson et al. | 370/113 |
| 3,535,458 | 10/1970 | Gottfried et al. | 370/113 |
| 3,539,983 | 11/1970 | Burg | 367/56 |
| 4,017,687 | 4/1977 | Hartzler et al. | 370/112 |
| 4,072,923 | 2/1978 | Siems et al. | 367/78 |
| 4,122,311 | 10/1978 | Klatt et al. | 370/112 |

*Primary Examiner*—Howard A. Birmiel
*Attorney, Agent, or Firm*—Hubbard, Thurman, Turner, Tucker & Glaser

[57] ABSTRACT

A seismic prospecting roll along switch incorporating electronically controlled switches in an improved switch arrangement requiring far fewer switches than previous systems. In a simple form, one switch is provided for each geophone input with one contact of each switch connected to one of the inputs and the other contact of each switch connected in pairs, appropriately selected, to the inputs of amplifier and filter channels. A controller is provided for electronically closing the appropriate switches for each roll along position. In most roll along positions geophone inputs are connected out of order to the signal processing channels and the sequence is corrected by a modified multiplexer which connects the processing channels to a system analog to digital converter.

9 Claims, 3 Drawing Figures

4,308,598

SIMPLIFIED ROLL ALONG SWITCHING

BACKGROUND OF THE INVENTION

This invention relates to seismic roll along switching equipment and in particular to an improved electronically controlled switching system having a greatly reduced number of signal switches.

In seismic geophysical prospecting the geophysical roll along approach is commonly employed. In this method a large number of geophone groups and shot points are laid out along a prospecting traverse. During any given initiation, or shot, only part of the geophones are used to record reflections from the initiation. For example, in a typical system 96 geophone groups may be laid out while only forty eight, twenty four on either side of the shot point, will be used to record reflections from the particular shot point. Such systems typically have one signal processing channel for each of the active geophone groups. Each processing channel comprises amplifiers and filters which are matched to a very high precision and typically comprise the most expensive single part of the prospecting system.

The outputs of the signal processing channels are usually coupled by means of a multiplexer to the input of a single analog to digital converter, the output of which is serially recorded on magnetic tape for later processing. It is generally preferred that the channel outputs be recorded in a sequence corresponding to the positions of the active geophone groups starting at one end of the spread. It is apparent that a rather complicated switching matrix is required to connect a particular set of 48 geophones out of the 96 groups to the processing channels and to change this for each of the shot points provided on the traverse. For example, at the first shot point on the traverse it may be desired to connect geophones number 1 through 48 to the forty eight amplifier channels in sequence. At the second shot point in the roll along process geophone groups numbered 2 through 49 may then be connected in order to the same forty eight processing channels. When carried through the entire seismic traverse, it can be seen that each of the amplifier inputs must be capable of being connected to any one of at least forty nine geophone group outputs. When the forty eight inputs are multiplied by the forty nine possible positions it can be seen that a total of 1,352 switches must be used to accomplish this goal. Since each geophone output provides a low signal level, each of the lines has its own ground line so that the total number of switches is actually doubled.

The presently used commercial roll along switches do in fact use either mechanical relays or switches having literally thousands of switch contacts for performing the roll along function. Some commonly used switching matrixes employ large numbers of sliding switch contacts which are moved across the surface of a printed circuit board to provide the necessary sets of connections. A rotary version of this type matrix is sold under the trademark "Rot-A-Long" by Input/Output Devices, Inc., of Houston, Tex. and a linear version is sold under the part number S100-002131 by GUS Manufacturing, Inc., of El Paso, Tex.

The known roll along matrixes are limited in several ways by the fact that they are basically mechanical devices. The thousands of switch contacts which are employed are prone to contact failure especially when used in field conditions typically encountered in geophysical prospecting. The devices tend to to be quite inflexible since a large number of switches must be arranged to provide at least one common set of roll along positions and in most practical cases only the one set can be performed by a given switching matrix. While solenoid and ratchet arrangements can be used to remotely move the known roll along matrixes through their various positions, any failure of the mechanism to operate will cause erroneous selections of groups throughout the rest of the operation. As a result of these problems the roll along matrix has essentially always been housed in the main recording equipment near an operator who is able to visually check for proper operation.

It can be seen that a reduction in the number of switches involved in a roll along switching matrix is desirable and that any substantial reduction in the number would greatly enhance the accuracy and reliability of geophysical prospecting systems. In addition it is desirable that the switches employed in such systems be electronically switchable to avoid mechanical failures and to increase the flexibility of operation.

SUMMARY OF THE INVENTION

Accordingly, an object of the present invention is to provide an improved geophysical prospecting system having a minimum number of low signal level switches.

Another object of the present invention is to provide an electronically controllable roll along switch for geophysical prospecting systems.

A roll along seismic prospecting system, according to the present invention, includes a roll along switch matrix having a number of switches equal to the number of geophone inputs provided in the system with the switches connected in sequentially repeating groups equal in number to the number of signal processing channels. Also included in the system is means for reordering the active channel outputs for proper sequential serial recording. Reordering apparatus may include a modified multiplexer addressing arrangement or totally digital reordering means coupled to an analog to digital converter output.

BRIEF DESCRIPTION OF THE DRAWINGS

The present invention may be better understood by reading the following detailed descriptions of the preferred embodiments with reference to the accompanying drawings wherein.

DESCRIPTION OF THE PREFERRED EMBODIMENTS

Figure 1:
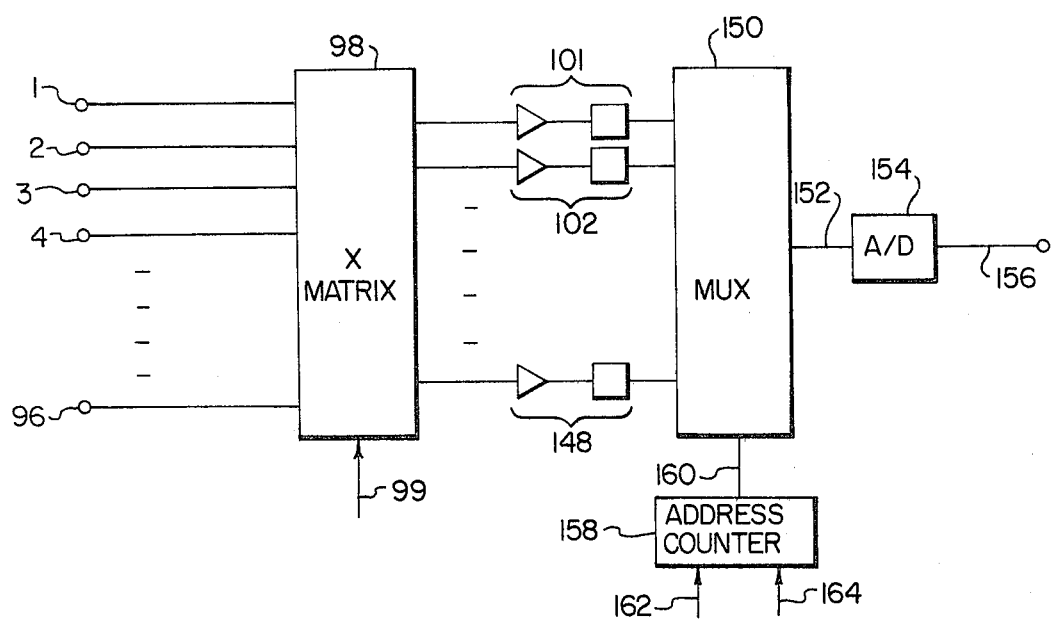
FIG. 1 is a block diagram of a portion of a roll along geophysical prospecting system according to the prior art.

With reference now to FIG. 1 there is illustrated a portion of a geophysical prospecting system as used in the prior art. Such a system may typically have inputs 1 through 96 for connection to ninety six geophones or groups arranged in a linear spread in the field. The geophones are usually operably connected by means of multiconductor land cable to a central recording truck containing the apparatus illustrated in FIG. 1. The inputs 1 through 96 each typically comprise two lines, one for signal and one for return, since the geophone output signals are at a very low level prior to amplification. These 96 inputs are coupled to a switching matrix 98 which has 48 outputs connected to signal processing channels numbered 101 through 148. The function of matrix 98 is to connect a sequential set of 48 of the inputs 1 through 96 to signal processing channels 101 through 148. An input 99 is provided for moving the mechanical portion of of matrix 98 to a selected roll along position to make the appropriate 48 connections. In a typical system input 99 comprises a mechanical selector switch although, as noted above, electromechanical devices in the nature of solenoids and ratchets can be employed for sequencing matrix 98 through its possible roll along positions. As noted above, the matrix 98 must have at least 1,352 switches (double pole) in order to be able to connect 48 channels to the 96 inputs in 49 different patterns.

In the typical conventional system, each of the channels 101 through 148 is connected in order to the inputs of a multiplexer 150 which has a single output 152 connected to the input of an analog to digital converter 154. A/D converter 154 provides a digitized signal on an output 156 which is typically coupled to a recording system for permanent recording on magnetic tape. The multiplexer 150 is typically controlled by an address counter 158 which is often internal to the device but may be external as illustrated in FIG. 1. Counter 158 typically provides an address on an output line 160 coupled to multiplexer 150 to select which of the multiplexer inputs is connected to the output 152. The counter 158 receives signals from the rest of the prospecting system allowing it to couple the channel outputs to the converter 154 at the appropriate time during each sample period. For example, after matrix 98 has been adjusted for a particular shot position and the shot has been fired, the system may record samples of geophone outputs at one millisecond time intervals. In such a case counter 158 would receive a reset signal on a line 162 at the one millisecond sample rate and during the sampling period would receive at least 48 impulses on a clock or strobe line 164. The reset pulse would cause address counter 158 to provide an all zeros address on output 160 and each pulse on clock line 164 would cause the address to increment by one digital number. The result is that during each sample period signals on line 160 would cause multiplexer 150 to couple processing channels 101 through 148 in that order to the A/D converter 154.

As will be appreciated by those skilled in the art, FIG. 1 is a simplified illustration of a typical geophysical system. Each of the channels 141 through 148 may contain multiple preamplifying and filtering stages. Likewise each channel or the converter 154 may include gain ranging amplifiers and the like. FIG. 1 illustrates the complexity involved in switching the selected sets of geophone inputs to the critical signal processing channels of a seismic geophysical system.

Figure 2:
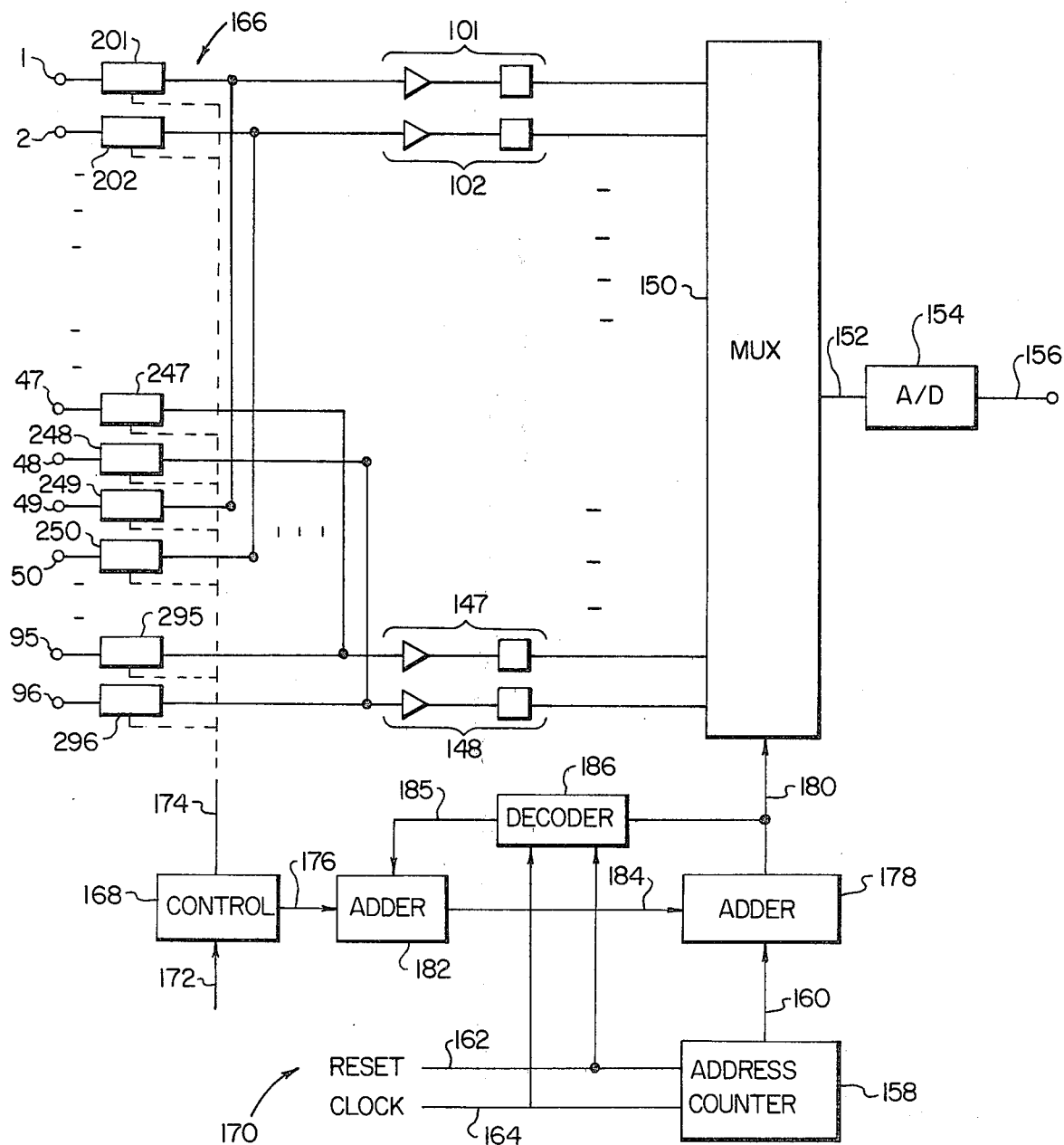
FIG. 2 is a block diagram of a roll along geophysical prospecting system according to the present invention.

FIG. 2 illustrates the same portions of a geophysical prospecting system as FIG. 1 but modified according to the present invention. The same designation numbers are used to identify the various parts which are common between FIGS. 1 and 2. For example, the same inputs 1 through 96 are provided for connection to ninety six geophone groups and the same signal processing channels 101 through 148 are provided for processing 48 of these signals at a time. Likewise a multiplexer 150 is provided for coupling the channel signal sequentially to an output 152 for conversion by A/D converter 154 and coupling to an output 156 for permanent serial recording. Improvements illustrated in FIG. 2 include a vastly simplified roll along switching matrix designated generally 166, a switch controller 168, and a modified multiplexer addressing arrangement shown generally at 170.

The great simplification of the present invention occurs primarily in the switching matrix 166 which comprises switches 201 through 296 each having one contact connected to each of the inputs 1 through 96 respectively. As noted above each of these switches would typically comprise a double pole switch to provide a return path for each signal but for simplicity only a single pole arrangement is illustrated. Each of the switches 201 through 296 has a second contact connected in pairs to 48 junctions connected permanently to inputs of signal processing channels 101 through 148. Thus for example switches 201 and 249 each have one contact connected to channel 101. Likewise switches 202 and 250 each have a contact connected to the input of channel 102.

While switches 201 through 296 could be manually controllable switches, in the preferred embodiment the switches are electronically switchable from open to closed positions. A reed relay sold under the part number 720-R-12 by the Teledyne Corporation is believed to be suitable for this purpose for several reasons. This relay is glass encapsulated so that it is immune to dust, moisture or other environmental conditions experienced in field operations. In addition this relay latches in both its open and closed positions so that once it is switched to a selected position it "remembers" the last command. But since even this type of relay involves a mechanical moving part, it is anticipated that a solid state switching device such as the FET switch sold under the number DG 509 by Siliconix Corporation may be preferred for use as the switches 201 through 296. With either type of switching device it is preferred that some type of high voltage suppression circuitry be included in the inputs 1 through 96 to avoid static discharge damage to the small signal switches. Such static discharge or high voltage spikes often occur as the result of induction from lightening strikes in the vicinity of the system.

Since the switches 201 can take various forms the controller 168 may also take various forms. But since the preferred switches 201 through 296 are electronically controllable controller 168 is preferably a processor adapted for responding to a command on a line 172 calling for a particular roll along position by providing signals on an output line 174 to switch an appropriate set of switches 201 through 296 to a conductive state for the particular shot. The command on line 172 may be an indication of the location of the shot point from which controller 168 could determine the appropriate geophones located on either side of the shot point which should be activated. In similar manner the signal on line 172 may be an indication of the locations of the first and/or last active geophone group for the particular shot. In any case, from the signal received on line 172, controller 168 is able to determine the lowest numbered geophone group which is to be active and in addition the groups which may be left inactive in the center of the spread for gapping purposes. An indication of the processing channel number to which the lowest numbered active group is connected is, in the preferred embodiment, provided on an output line 176 for purposes described in more detail below. Gapping is the usual practice of leaving a small number of groups at, or adjacent to, the shot point inactive for a particular shot.

The line 174 by which controller 168 is coupled to switches 201 through 296 may take several forms. In the most straightforward approach a separate conductor would be provided from controller 168 to each of the switches to allow individual and simultaneous control of switch positions. But since this would require a large number of conductors other switching arrangements are believed to be more appropriate. For example, a matrix arrangement using twenty individual leads can provide selected access to up to one hundred switches and would be quite suitable for the present roll along switching arrangement in which the reed relays are used. Alternatively a digital address may be assigned to each of the roll along switches if a decoder is also provided for each switch to recognize its address. In such a case, a seven bit bus and one bit command line would be sufficient for sequentially switching each of the switches off and on. In most cases, as will be explained in more detail below, each roll along step only requires turning one or two switches on and one or two switches off so that the sequential accessing arrangements are quite suitable. In any case, it is preferred that the switches 201 through 296 be electronically controllable so that they may be remotely controlled and/or automatically controlled by a programmed device such as controller 168.

In the preferred embodiments a number of elements are added to address counter 158 to provide an addressing sequence for multiplexer 150 which insures that the lowest numbered input being used is always the first coupled to output 152 during each sample interval. Counter 158 may receive the same reset and clock inputs 162 and 164 as provided in the FIG. 1 device. The address output 160 from counter 158 is coupled to one input of an adder 178 which has an output 180 coupled to the address input of multiplexer 150. Adder 178 has a second input coupled to the output of an adder 182 by a line 184. Adder 182 has a first input connected to the line 176 from controller 168 for receiving an address corresponding to the processing channel connected to the lowest numbered active input. A decoder 186 has inputs connected to the output line 180 from adder 178 and to the reset and clock lines 162 and 164 and provides an output on a line 185 coupled to a second input of adder 182.

In this improved addressing arrangement 170 the address counter 158 operates in the same way as the FIG. 1 device. That is at the beginning of each sample period the counter 158 receives a reset signal 162 and provides a zero address corresponding to the first input of multiplexer 150 on its output line 160. The counter 158 then responds to clock pulses received on line 164 by incrementing one digital bit at a time and providing sequential addresses on output line 160. The adder 178 receives these addresses and adds to this the address received on line 184 to provide an output on line 180 in the appropriate sequence corresponding to a particular roll along position. At the beginning of the sample cycle the address received on line 184 is the same as that provided on line 176 from controller 168. Thus if controller indicates that processing channel 120 is connected to the lowest numbered active input then this address is coupled through adder 182 to adder 178 so that the starting address on line 180 is that of processing channel 102. This same address is added to each of the following sequential addresses on line 160 from counter 158.

In most cases the number of processing channels 101 through 148 will not correspond precisely to the number of possible addresses provided by a counter such as counter 158. Thus in the preferred embodiment counter 158 has six digital bits and can thereby provide sixty-four different addresses. But in the preferred embodiment there are only forty eight processing channels. Thus it will be appreciated that when the addresses on line 160 reach the upper level, that is for example address 48, and an additional increment is added by adder 178 the output address on line 180 would be greater than any allowable address in multiplexer 150. For proper operation the address on line 180 following the address of channel 148 must be that of the first channel 101. Decoder 186 and adder 182 are provided for this purpose. Decoder 186 receives the addresses on line 180 and senses the occurrence of the forty eighth address. Upon the occurrence of the next clock impulse on line 164 the decoder 168 couples by line 185 an additional increment to the second input of adder 182. For example, in the preferred embodiment an increment of sixteen is added by adder 182 to the starting address on line 176. That is, the address on line 184 is incremented by sixteen units on the clock pulse following the occurrence of the largest valid address on line 180. Decoder 186 includes a flip-flop which maintains an increment on line 184 until such time as a reset pulse occurs on line 162. At the end of a sample interval, after all the valid addresses have been coupled to multiplexer 150, the reset pulse occurs on line 162 resetting the outputs of both counter 158 and decoder 186 to zero. The increment provided by decoder 186 is selected as the difference between the maximum possible address provided by counter 158 and the number of active channels. Thus in the present case, the increment of sixteen is the difference between the sixty four possible addresses and the forty eight processing channels.

Figure 3:
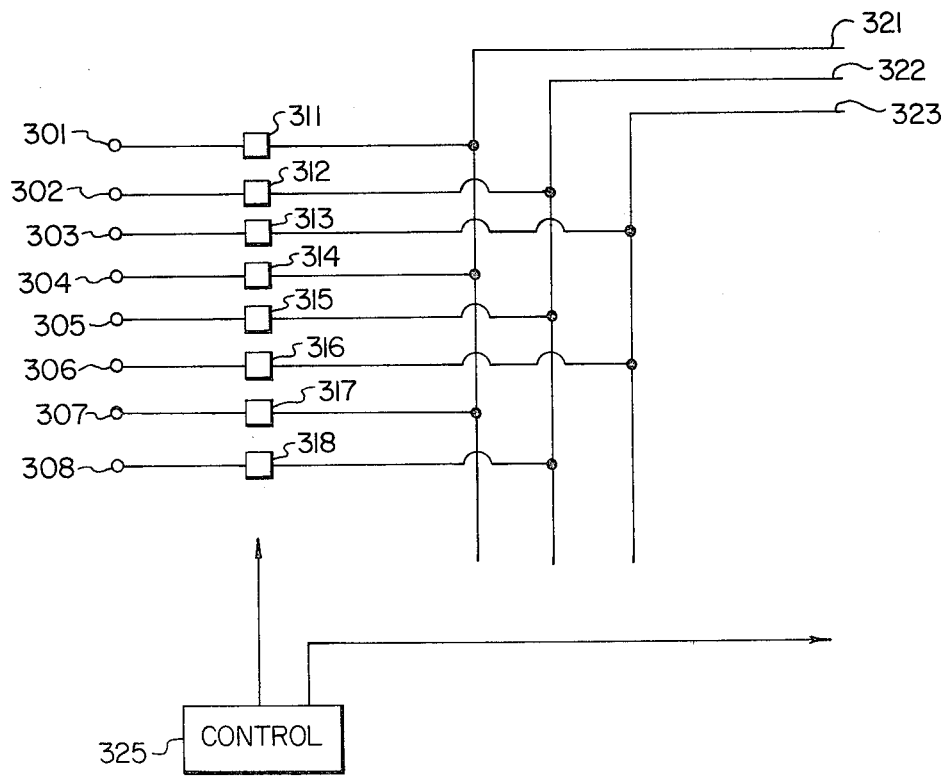
FIG. 3 is an illustration of another switching matrix according to the present invention.

With reference now to FIG. 3, the concept of the present invention is more generally illustrated by means of an example involving eight inputs being coupled to only three active channels. In FIG. 3, eight geophone inputs are numbered 301 through 308 respectively. Each of these inputs has a single switch 311 through 318 respectively. One side of each of the switches 311 through 318 is connected to one of three output signal lines 321 through 323. It can be seen from FIG. 3 that this switch arrangement still employs only one switch per input line and that one side of each switch is connected to one of a number of output lines corresponding to the number of active channels. It can also be seen that not all output channels have the same number of input lines coupled to them. Thus, for example, output lines 321 and 322 are each connected to three switches, while line 322 is connected to only two. The number of inputs can be increased by simply following the sequence illustrated in which each third input is connected to a particular output line. Thus, inputs 301, 304, and 307 are connected to output 321. A control unit 325 closes three of the switches 311 through 318 at any one time and need only open one switch and close another to roll one shot position to the next. Controller 325 likewise provides the necessary information to an address counter and multiplexer as illustrated in FIG. 2. Thus it can be seen that the present invention is not limited to any particular number of geophone groups or processing channels or even any particular ratio between the number of geophone groups and processing channels. The example of ninety six groups and forty eight active channels illustrated in FIG. 2 is preferred merely because it represents a system in fairly common use in the geophysical industry.

The operation of a roll along geophysical prospecting system according to the present invention will be described with respect to FIG. 2. As with any other roll along system a large number, for example ninety six geophone groups are positioned along a prospecting path on the earth's surface. These ninety six groups are connected in normal fashion to the ninety six inputs of the recording system numbered 1 through 96 in FIG. 2. The operator of the system or an automated controller dials in or otherwise calls for the first roll along position in which the first forty eight geophones are used to record reflections from the first seismic initiation. The indication of this first roll along position is coupled to controller 168 by input 172. In response to this command the controller 168 closes switches 201 through 248 thereby connecting the first forty eight inputs to the forty eight processing channels effectively. In a typical system the first shot point may be near a position 24 and a small group of the geophones near the shot point may be held inactive during the first shot. For example, the switches 224 and 225 may be left open during the first shot to provide a gap about the first shot point. In any case, most of the switches in the set of switches comprising the first forty eight are connected to the 48 processing channels. Controller 168 provides an address on line 176 corresponding to the processing channel connected to the lowest numbered active channel. In this case, the address on 176 would typically be all "0" indicating the first processing channel. Just before the initiation an impulse is applied to reset line 162 so that all "0" addresses also occur on lines 160 and 184. As a result the address on line 180 at the input of multiplexer 150 is also all "0's" and the first processing channel 101 is coupled to A/D converter 154. For this first initiation counter 158 sequences through forty eight addresses which are coupled unchanged to the line 180 so that all forty eight processing channels are coupled to the converter 154.

When all the samples are taken from the first shot, the system is prepared for the second shot by indicating the desired roll along position on line 172 again. The next initiation typically occurs one or two locations further down the prospecting path. If for example the second shot is to be near the twenty fifth group controller 168 need roll along one position only. This is accomplished by opening switch 201 and closing switch 249. If a gap about the shot point is employed then an additional switch opening and closing is required. The address provided on 176 is then incremented by one space to a digital "1" corresponding to the address of processing channel 102. This address is coupled through adder 182 to adder 178 and added to the "0" output of counter 158 to provide a starting address on line 180 corresponding to channel 102. Counter 158 responds to a sequence of clock pulses for each sample period in the normal manner and decoder 186 functions as noted above so that the addresses provided on line 180 start at the second position corresponding to channel 102. The addresses then sequence through the remaining addresses in increasing order and finally end at the address corresponding to channel 101. The same sequence is repeated for each of the roll along positions throughout the entire prospecting path. With this arrangement the output provided at line 156 is identical to that provided by the prior art systems using the mechanical roll along switches. That is, for each roll along position the samples are provided serially at output 156 always beginning with the sample from the lowest numbered active channel in the spread.

It will be apparent that other schemes may be employed for reordering the signals provided to output 156 if a conventional address counter arrangement, as provided in FIG. 1, were used with the improved roll along switch according to the present invention. Thus, instead of modifying the addressing sequence as shown in FIG. 2, the signals on output 156 could be fed into a recirculating memory during each sample interval. The circulating memory could then be advanced an appropriate amount until the signal from the first active geophone group is provided at its output and then read out beginning with that signal until all signals have been read from the memory. The output line 176 from controller 168 would be used in such a case to indicate the amount of advance needed in the recirculating memory to reach the appropriate first signal in a sequence.

Regardless of which reordering arrangement is employed the simplified switching apparatus of the present invention has several major advantages. The most obvious is the great reduction in the number of switches or contacts required to perform the roll along function. Thus 96 switches are employed to perform the roll along switching function in which prior devices require 1,352 switches. In addition, in rolling from one position to the next, very few switch openings and closings are required. That is in a prior system forty eight contacts are opened and forty eight new contacts are made in each roll along operation. The present arrangement also allows a gap about the shot point to be modified quite easily. Any or all of the switches in any sequential group of forty eight switches may be closed for a particular shot. The controller 168 can leave a gap of open switches at any point within the set of forty eight switches whereas the prior mechanical devices made changes in the gap difficult to achieve. The fact that the switches 201 through 296 are electronically switchable and can be totally solid state makes the remote location of the roll along device quite practical. That is, the roll along system of the present invention may easily be incorporated in portable data acquisition units distributed along a prospecting path and remotely controlled by master system on a control or recording truck.

While the present invention has been illustrated and described in terms of specific apparatus, it is apparent that other modifications and changes can be made within the scope of the present invention as defined by the appended claims.

I claim:

1. In a roll along geophysical prospecting system of the type having "m" geophone inputs, a smaller number "n" signal processing channels and switching network, the improvement comprising a simplified for coupling selected sets of "n" of said "m" geophone inputs to said "n" signal processing channels, at least one of said selected sets being connected in out of serial order to said processing channels, said switching network having "m" switches each having a first contact connected to an input of one of said "n" signal processing channels.

2. In a geophysical prospecting system according to claim 1 wherein said switches are electronically switchable between open and closed states, the further improvement comprising an electronic controller for closing a preselected set "n" of said "m" switches for each roll along position.

3. In a geophysical prospecting system according to claim 2 wherein said system has a multiplexer for sequentially coupling outputs of said "n" processing channels to a single digitizing means, an improved multiplexer coupled to said controller for coupling the outputs of said "n" processing channels to said digitizing means in a sequence selected as a function of the set "n" of switches closed for each roll along position.

4. In a geophysical prospecting system of the type having inputs 1 through "m" for connection to a spread of "m" geophones positioned on the earth's surface in preselected order, signal processing channels 1 through "n", where "n" is smaller than "m", and switching means for connecting a sequential set of up to "n" of said "m" inputs to said "n" processing channels, improved switching means comprising: switches 1 through "m" each having a first contact connected to the inputs 1 through "m" respectively and each having a second contact connected to inputs of said processing channels 1 through "n" in a repeated sequential order such that second contacts of switches 1 through "n" are connected to inputs of processing channels 1 through "n" respectively, second contacts of switches "n"+1 through "2n" are connected to inputs of processing channels 1 through "n" respectively, and so on, and control means for selectively closing a plurality of said switches within a preselected sequential set "n" of said switches 1 through "m".

5. In a geophysical prospecting system according to claim 4 further including an analog-to-digital converter and a multiplexer for sequentially coupling outputs of said processing channels to the analog-to-digital converter, an improved multiplexer having an input coupled to said control means for determining the lowest numbered of said switches 1 through "m" closed by said control means, and means for coupling outputs of said processing channels to said analog-to-digital converter in sequence beginning with the channel connected to said lowest numbered switch.

6. A geophysical prospecting system according to claim 5 wherein said improved multiplexer includes an address counter having a digital output which sequentially increases, and an adder having a first input connected to said counter output, a second input connected to said control means for receiving an address corresponding to the processing channel connected to said lowest numbered closed switch, and an output for controlling which multiplexer input is connected to said analog-to-digital converter.

7. A geophysical prospecting system according to claim 6 further including decoding means having an input connected to the output of said adder for detecting an output address corresponding to processing channel "m" and an output coupled to said control means for adding an additional number to the address coupled to said adder second input selected to provide as the next sequential output of said adder an address corresponding to processing channel 1.

8. In seismic roll along prospecting, a method for coupling preselected sets of signals from "m" geophone inputs to a smaller set of "n" processing channels, at least one of said preselected sets of signals coupled in out of serial order to said processing channels, said method comprising:
    connecting geophone inputs "1" through "m" to first contacts of "m" switches,
    connecting second contacts of said "m" switches to inputs of processing channels "1" through "n" in a repeated sequential order, and
    selectively closing a plurality of switches within a preselected sequential set "n" of said switches "1" through "m."

9. The improved method of claim 8 further including:
    coupling outputs of said processing channels "1" through "n" to inputs of a multiplexer, and
    addressing said multiplexer in a sequence beginning with the address corresponding to the processing channel coupled to the lowest numbered geophone input connected to a processing channel by a closed switch.

* * * * *

UNITED STATES PATENT AND TRADEMARK OFFICE
CERTIFICATE OF CORRECTION

PATENT NO. : 4,308,598
DATED : December 29, 1981
INVENTOR(S) : Kamal A. Mahmood

It is certified that error appears in the above-identified patent and that said Letters Patent are hereby corrected as shown below:

Column 5, line 64, "120" should be --102--. See page 11, line 28 of the original specification.

Column 6, line 56, "322" should be --323--. See page 13, line 21 of the original specification.

Signed and Sealed this

Twenty-ninth Day of June 1982

[SEAL]

Attest:

Attesting Officer

GERALD J. MOSSINGHOFF

Commissioner of Patents and Trademarks

UNITED STATES PATENT AND TRADEMARK OFFICE
CERTIFICATE OF CORRECTION

PATENT NO. : 4,308,598
DATED      : December 29, 1981
INVENTOR(S) : Kamal A. Mahmood It is certified that error appears in the above-identified patent and that said Letters Patent is hereby corrected as shown below:

Column 8, line 58, after "simplified" insert -- switching network --.

Signed and Sealed this

Seventeenth Day of August 1982

[SEAL]

Attest:

Attesting Officer

GERALD J. MOSSINGHOFF
Commissioner of Patents and Trademarks